United States Patent [19]

Sato et al.

[11] Patent Number: 5,027,115
[45] Date of Patent: Jun. 25, 1991

[54] PEN-TYPE COMPUTER INPUT DEVICE

[75] Inventors: Kimikatsu Sato, Sagamihara; Ryuichi Toyoda, Yokohama; Takeshi Masaki, Kawasaki, all of Japan

[73] Assignee: Matsushita Electric Industrial Co., Ltd., Japan

[21] Appl. No.: 575,767

[22] Filed: Aug. 31, 1990

[30] Foreign Application Priority Data

Sep. 4, 1989 [JP] Japan .................................. 1-228512

[51] Int. Cl.⁵ ...................... H03K 13/02; G09G 3/00; G06F 3/00
[52] U.S. Cl. .......................................... 341/13; 341/5; 341/31; 341/32; 341/173; 341/33; 341/16; 340/707; 340/711; 250/227.13
[58] Field of Search .................... 341/5, 13, 14, 20, 31, 341/32, 173; 340/707, 708, 709, 711; 2250/416, 445, 252

[56] References Cited

U.S. PATENT DOCUMENTS

| | | | |
|---|---|---|---|
| 3,269,190 | 8/1966 | Laman | 74/471 |
| 3,304,434 | 2/1967 | Koster | 250/231 |
| 3,395,589 | 8/1968 | Gersten | |
| 3,541,521 | 11/1970 | Koster | 340/710 X |
| 3,541,541 | 11/1970 | Engelbart | |
| 3,613,090 | 10/1971 | Mason | 341/5 |
| 3,904,277 | 9/1975 | Phillips et al. | 350/252 |

Primary Examiner—J. R. Scott
Assistant Examiner—Sharon D. Logan
Attorney, Agent, or Firm—Lowe, Price, LeBlanc & Becker

[57] ABSTRACT

A pen-type computer input device is used to move a cursor on the display of a computer system or enter data such as of figures, letters, numerals, or the like into a computer system. The pen-type computer input device includes a shank, a ball rotatably supported on the tip end of the shank, the ball having a plurality of identifiable regions on an outer peripheral surface thereof, and a circuit including a sensor unit for detecting the identifiable regions in response to rotation of the ball, and for detecting the directions in which the ball rotates and the distances by which the ball moves two perpendicular directions in a plane, and producing an output signal representative of the directions and distances. Since the sensor unit can detect the distance by which the pen-type computer input device moves without any mechanical motion transmitting mechanism incorporated in the shank, the pen-type computer input device may be small in size and can be handled with ease.

5 Claims, 4 Drawing Sheets

PEN-TYPE COMPUTER INPUT DEVICE

BACKGROUND OF THE INVENTION

The present invention relates to a pen-type computer input device for moving a cursor on the display of a computer system or entering data such as of figures, letters, numerals, or the like into a computer system.

Various computer input devices such as a keyboard, a mouse, a digitizer, a light pen, a tablet, etc. are used in the art of computers. The mouse is a device for relatively moving a cursor displayed on a CRT. The mouse can move the cursor at high speed and can also freely draw a figure or the like on the CRT display through relatively simple manual operation. Mouses now in use are largely classified into two groups. In one group, the mouse comprises a rotatably supported ball whose angular displacement is used to detect the distance which is traversed by the mouse. In the other category, the mouse is moved over a board which is marked with a checkerboard pattern, and the distance by which the mouse is moved is detected by a photosensor.

Mouses may be used in different ways depending on the software of computer systems with which the mouses are associated. Basically, when a desired figure or line is to be drawn using a mouse, the mouse is moved to move a cursor on a computer display along a path corresponding to such a figure or line. Since it is difficult to move a mouse over small distances because of its size and structure, and it is impossible to monitor any movement of the mouse directly, it is highly difficult to enter small figures, letters, and numerals through the mouse. The other conventional computer input devices are also incapable of entering small figures and free curves desirably.

SUMMARY OF THE INVENTION

In view of the aforesaid problems of the conventional computer input devices, it is an object of the present invention to provide a pen-type computer input device which is small in size, can easily be handled just like a writing implement, and hence can be used to enter figures, letters, numerals, etc. into a computer to which the input device is connected, in the exact pattern followed by the input device.

To achieve the above object, there is provided a pen-type computer input device comprising a shank having a tip end, a ball rotatably supported on the tip end, the ball having a plurality of identifiable regions on an outer peripheral surface thereof, and means including a sensor unit for detecting the identifiable regions in response to rotation of the ball, and for detecting the directions in which the ball rotates and the distances by which the ball moves two perpendicular directions in a plane, and producing an output signal representative of the directions and distances. Since the sensor unit can detect the distance by which the pen-type computer input device moves without any mechanical motion transmitting mechanism incorporated in the shank, the pen-type computer input device may be small in size and can be handled with ease.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
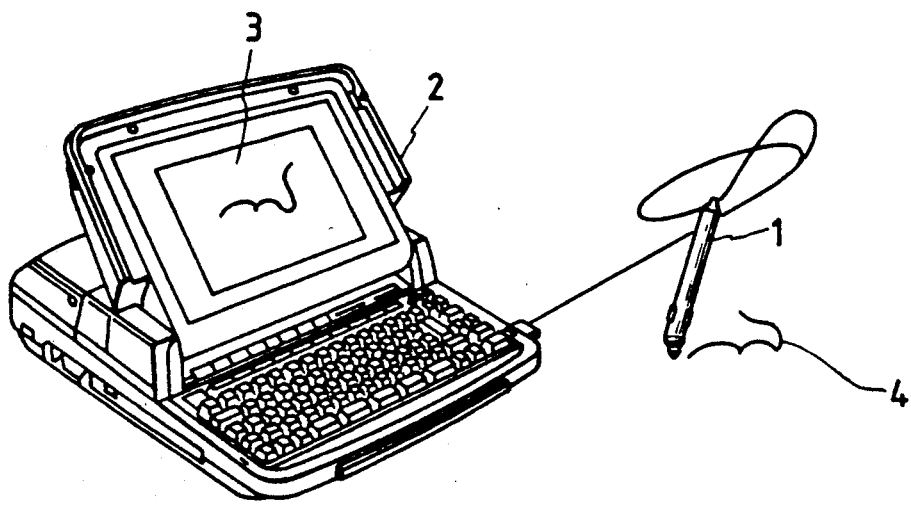
FIG. 1 is a perspective view of a pen-type computer input device according to a first embodiment of the present invention and a computer to which the pen-type computer input device is connected.

Like or corresponding parts are denoted by like or corresponding reference numerals throughout views.

A pen-type computer input device according to a first embodiment of the present invention will first be described below with reference to FIGS. 1 through 4.

As shown in FIG. 1, a pen-type Computer input device 1 is connected to a computer 2 which has a display 3. In operation, a free curve 4, which may represent any figure, letter, numeral, or symbol, drawn on a surface by the pen-type computer input device 1 is displayed on the display 3 of the computer 2.

Figure 2:
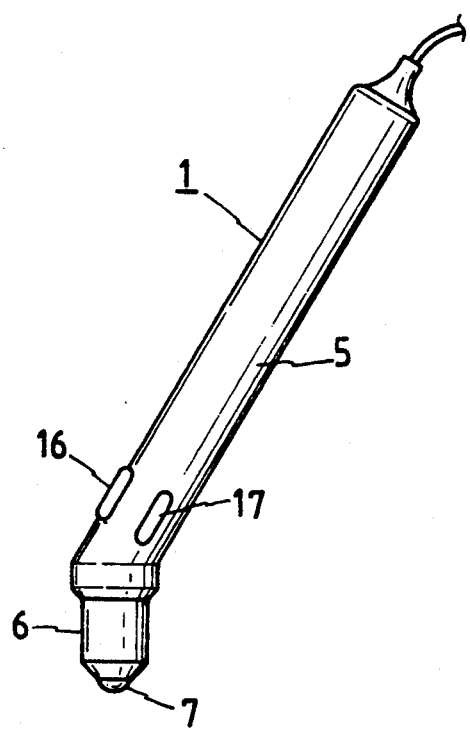
FIG. 2 is an elevational view of the pen-type computer input device shown in FIG. 1.
Figure 3A:
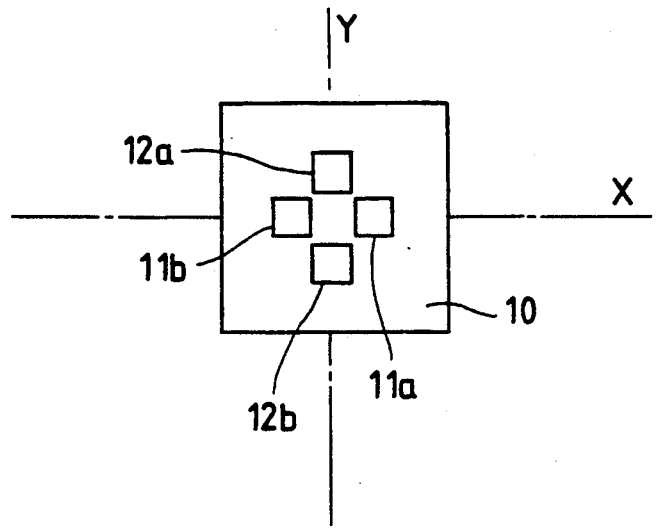
FIG. 3A is a plan view of a sensor unit in the pen-type computer input device.
Figure 3B:
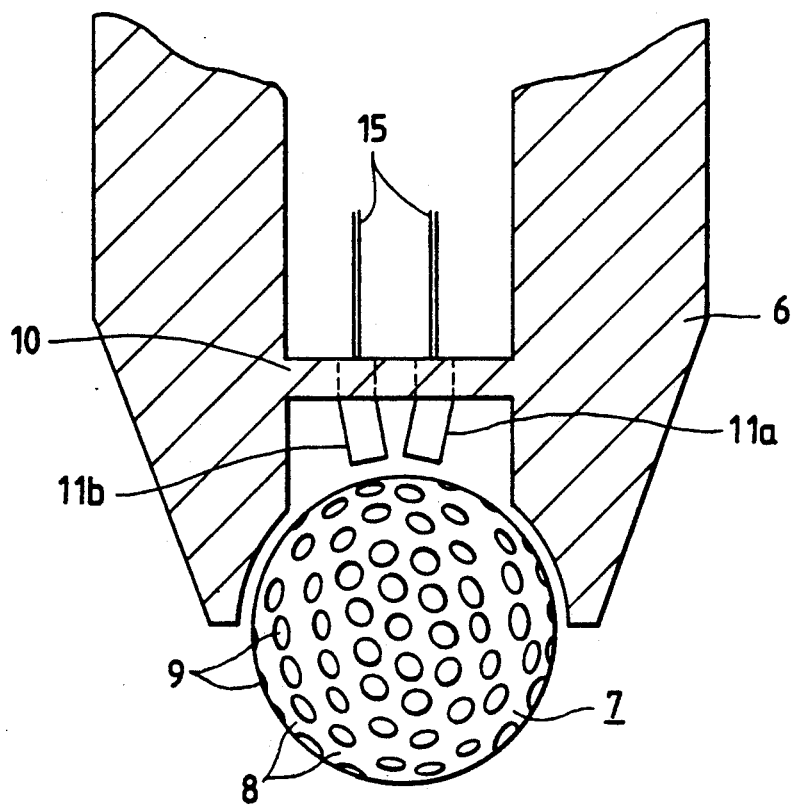
FIG. 3B is an enlarged fragmentary cross-sectional view of the pen-type computer input device according to the first embodiment.
Figure 4:
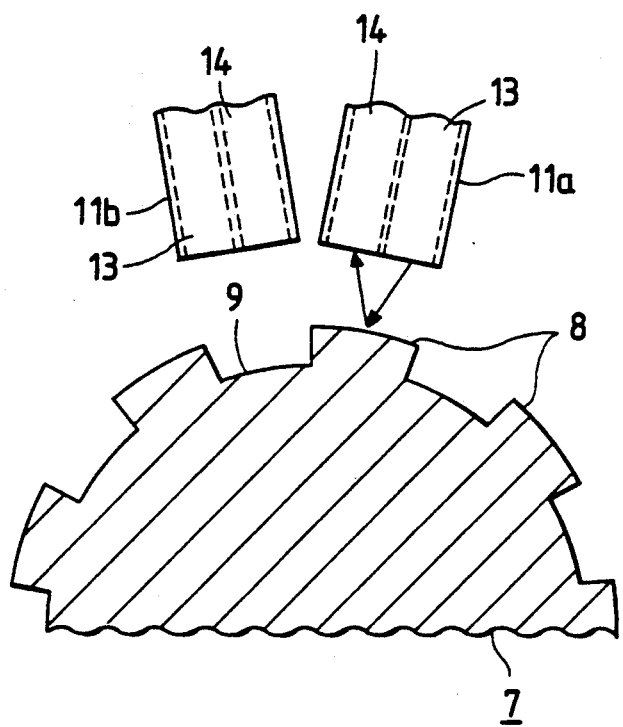
FIG. 4 is an enlarged fragmentary cross-sectional view of sensors and a ball in the pen-type computer input device according to the first embodiment.

As illustrated in FIGS. 2, 3A, and 3B, the pen-type computer input device 1 comprises a shank 5 including a support 6 on its tip end, and a steel ball 7 rotatably supported in the support 6. As shown in FIGS. 3B and 4, the ball 7 has on its outer peripheral surface a plurality of identifiable regions which comprise alternately arranged lands 8 and recesses 9. The lands 8 have outer light-reflecting surfaces, but the recesses 9 have light-absorbing surfaces which are treated in a known matter not to reflect light applied thereto.

The support 6 has a wall 10 disposed behind the ball 7 and supporting a sensor unit which comprises two pairs of photosensors 11a, 11b and 12a, 12b that are composed of optical fibers. The pair of photosensors 11a, 11b and the pair of photosensors 12a, 12b serve to detect the direction in which the ball 7 rotates and the distance by which the ball 7 moves, along an X-axis and a Y-axis, respectively, which extend perpendicularly to each other in a plane. Each of these photosensors 11a, 11b, 12a, 12b comprises a light-emitting element 13 and a light-detecting element 14. and is positioned close to the outer peripheral surface of the ball 7. The pair of photosensors 11a, 11b and the pair of photosensors 12a, 12b are arranged in a crisscross pattern, and are dimensionally related to the ball 7 such that when one pair of photosensors faces one of the lands 8, the other pair of photosensors faces an adjacent recess 9. Wires 15 for transmitting signals are connected to the respective photosensors 11a, 11b, 12a, 12b.

As shown in FIG. 2, the shank 5 has two input control switches 16, 17 which are positioned near the tip end of the shank 5 so that the switches 16, 17 can easily be operated on by fingers when the shank 5 is gripped by hand.

Operation of the pen-type computer input device 1 will now be described below.

The shank 5 of the pen-type computer input device 1 is gripped, and a free curve 4 is drawn on the surface with the pen-type computer input device 1 while the ball 7 is being pressed against the surface, as shown in FIG. 1. The pen-type computer input device 1 now produces an output signal representative of the direction and distance of movement of the ball 7. When the ball 7 rotates, the photosensors 11a, 11b arrayed along the X-axis and the photosensors 12a, 12b arrayed along the Y-axis detect the lands 8 and the recesses 9 as they move, thereby detecting the distance traversed by the ball 7. It is assumed that the photosensors 11a, 11b along the X-axis are 90° out of phase with each other. If the photosensor 11a, for example, is positioned above a land 8, light emitted from the light-emitting element 13 of the photosensor 11a is reflected by the land 8 and detected by the light-detecting element 14 of the photosensor 11b. Since the other photosensor 11b is positioned above an adjacent recess 9, light emitted from the light-emitting element 13 of the photosensor 11b is not reflected and hence not detected by the light-detecting element 14 of the photosensor 11a. When the ball 7 rotates along the X-axis, therefore, the photosensors 11a, 11b alternately detect the lands 8 and the recesses 9, thus detecting the distance by which the ball 7 moves. Similarly, when the ball 7 rotates along the Y-axis. The photosensors 12a, 12b detect the distance by which the ball 7 moves. Depending on whether there are output signals from the photosensors 11a, 11b, 12a, 12b, the direction and distance of movement of the ball 7 can be detected and analyzed, and outputted to the computer 2.

When the output signal from the sensor unit, which is representative of the direction and distance of movement of the ball 7, is sent to the computer 2, the computer 2 moves the cursor on the display 3 for thereby displaying a free curve corresponding to the free curve 4 that is drawn on by the pen-type computer input device 1.

The pen-type computer input device 1 can be used not only to draw curves such as figures, letters, numerals, symbols, or the like, but also to control the cursor displayed on the display 3.

A pen-type computer input device according to a second embodiment of the present invention will be described below with reference to FIG. 5.

Figure 5:
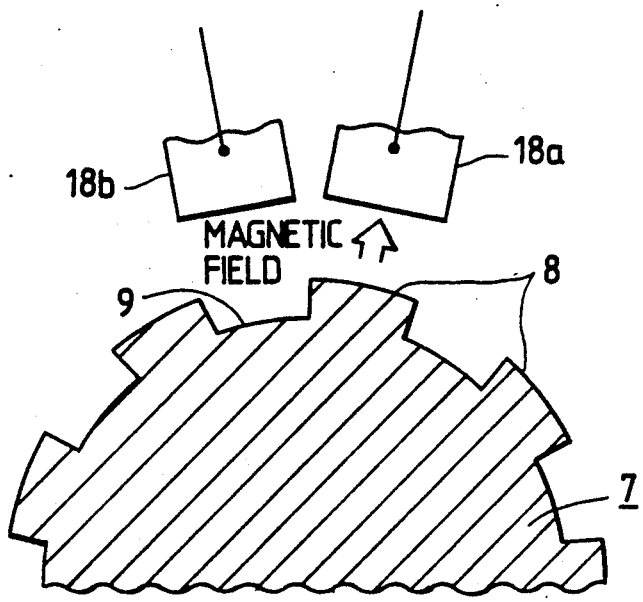
FIG. 5 is an enlarged fragmentary cross-sectional view of sensors and a ball in a pen-type computer input device according to a second embodiment of the present invention.

As shown in FIG. 5, the pen-type computer input device has a ball 7 made of a magnetic material and having a plurality of identifiable regions comprising alternately arranged lands 8 and recesses 9. The pen-type computer input device also has a sensor unit comprising a pair of magnetic sensors 18a, 18b arrayed along an X-axis for detecting the distance by which the ball 7 rotates along the X-axis, and another pair of magnetic sensors (not shown) arrayed along a Y-axis for detecting the distance by which the ball 7 rotates along the Y-axis. Each of the magnetic sensors comprises a magnetic reluctance element or the like for detecting a magnetic field. The other structural details of the pen-type computer input device according to the second embodiment are the same as those of the pen-type computer input device according to the first embodiment.

When the magnetic sensor 18a or 18b approaches a land 8 on the ball 7, an output signal produced thereby increases in level. When the magnetic sensor 18a or 18b approaches a recess on the ball 7, an output signal produced thereby decreases in level. Output signals produced by the non-illustrated magnetic sensors along the Y-axis also vary in the same manner as described above. Therefore, when the ball 7 rotates, the distance traversed by the ball 7 in each of the X- and Y-axis directions can be detected by the magnetic sensors. Accordingly, when the output signal from the sensor unit, which is representative of the direction and distance of movement of the ball 7, is sent to the computer 2, the computer 2 moves the cursor on the display 3 for thereby displaying a free curve corresponding to the free curve 4 that is drawn on by the pen-type computer input device 1.

Figure 6:
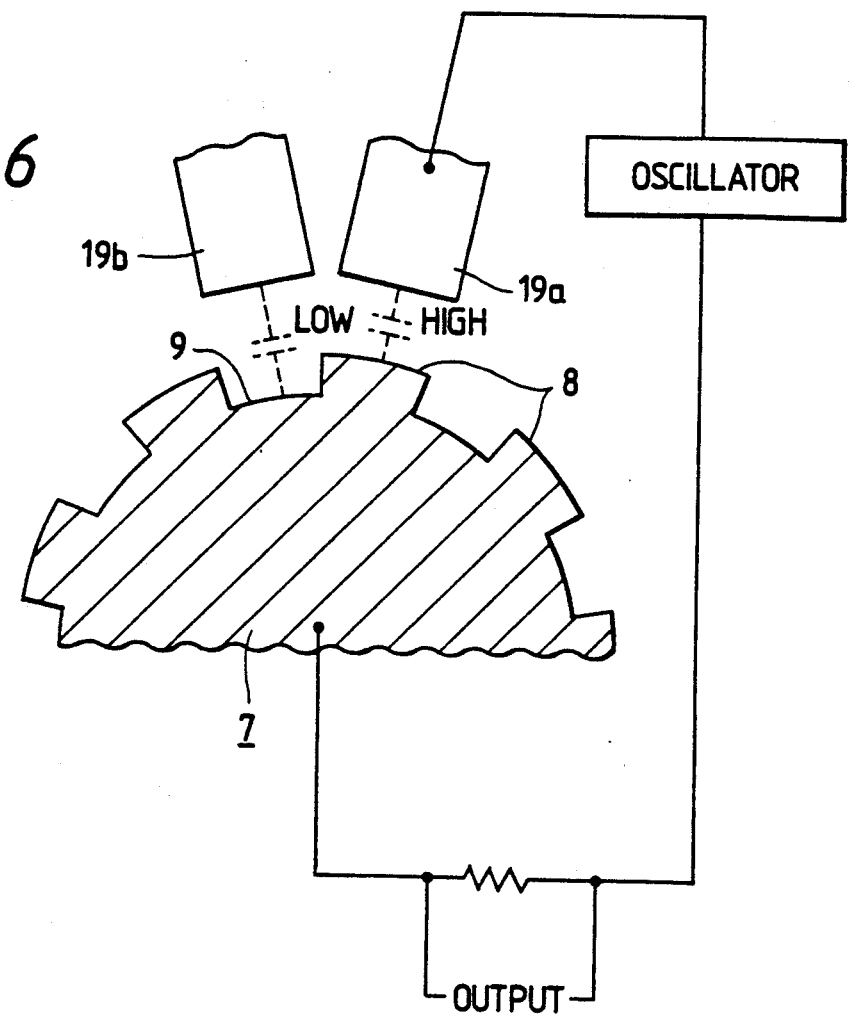
FIG. 6 is an enlarged fragmentary cross-sectional view of sensors and a ball in a pen-type computer input device according to a third embodiment of the present invention.

FIG. 6 shows a pen-type computer input device according to a third embodiment of the present invention.

As shown in FIG. 6, the pen-type computer input device has a ball 7 having a plurality of identifiable regions comprising alternately arranged lands 8 end recesses 9. The pen-type computer input device also has a sensor unit comprising a pair of electrodes 19a, 19b arrayed along an X-axis for detecting the distance by which the ball 7 rotates along the X-axis, and another pair of electrodes (not shown) arrayed along a Y-axis for detecting the distance by which the ball 7 rotates along the Y-axis. The electrodes 19a, 19b, the non-illustrated electrodes, and the ball 7 jointly constitute a high-frequency feedback-type oscillator circuit for producing an oscillating signal at several MHz. Each of the electrodes serves as one arm of a CR bridge of the oscillator circuit. The other structural details of the pen-type computer input device according to the third embodiment are the same as those of the pen-type computer input device according to the first embodiment.

In operation, when the ball 7 rotates in the X-axis direction, the electrostatic capacitance between the electrode 19a or 19b and the ball 7 varies depending on the distances between the electrode and the recesses 8 and the lands 9 on the ball 7. More specifically, the electrostatic capacitance is reduced at the lands 8 and increased at the recesses 9. Therefore, the distance traversed by the ball 7 as it rotates along the X-axis can be detected on the basis of changes in the electrostatic capacitance. Any distance traversed by the ball 7 in the Y-axis direction can also be detected in the same manner. When the output signal from the sensor unit, which is representative of the direction and distance of movement of the ball 7, is sent to the computer 2, the computer 2 moves the cursor on the display 3 for thereby displaying a free curve corresponding to the free curve 4 that is drawn on by the pen-type computer input device 1.

A pen-type computer input device according to a fourth embodiment of the present invention will be described below with reference to FIG. 7.

Figure 7:
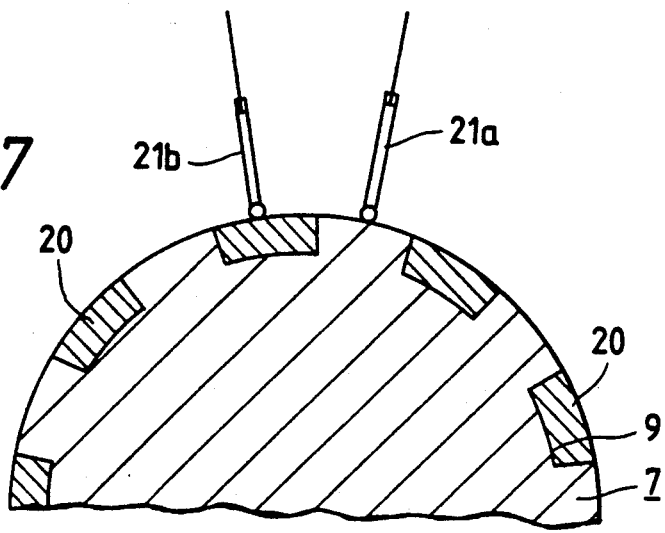
FIG. 7 is an enlarged fragmentary cross-sectional view of sensors and a ball in a pen-type computer input device according to a fourth embodiment of the present invention.

As shown in FIG. 7, the pen-type computer input device includes a ball 7 of an electrically conductive material which has a plurality of identifiable regions comprising a plurality of electrically insulating bodies 20 embedded in respective recesses 9 defined in the outer peripheral surface of the ball 7, leaving a plurality of electrically conductive regions between the insulating bodies 20. The pen-type computer input device also has a sensor unit comprising a pair of brushes 21a, 21b arrayed along an X-axis for detecting the distance by which the ball 7 rotates along the X-axis, and another pair of brushes (not shown) arrayed along a Y-axis for detecting the distance by which the ball 7 rotates along the Y-axis. The brushes 21a, 21b and the non-illustrated brushes have round or spherical tip ends held in sliding contact with the outer surface of the ball 7. The other structural details of the pen-type computer input device according to the fourth embodiment are the same as those of the pen-type computer input device according to the first embodiment.

In operation, an electric voltage is applied between the brushes 21a, 21b and the ball 7. When the ball 7 rotates in the X-axis direction, an electric current flows between the brush 21a or 21b and the ball 7 upon contact between the brush and one of the conductive regions of the ball 7. No electric current flows between the ball 7 and the brush 21a or 21b that contacts one of the insulating bodies 20. The above process holds true when the ball 7 rotates in the Y-axis direction. Therefore, the distances traversed by the ball 7 as it rotates along the X axis and the Y axis can be detected on the basis of current signals flowing between the ball 7 and the brushes 21a, 21b and the non-illustrated brushes. The output signal from the sensor unit, which is representative of the direction and distance of movement of the ball 7, is sent to the computer 2, the computer 2 moves the cursor on the display 3 for thereby displaying a free curve corresponding to the free curve 4 that is drawn on by the pen-type computer input device 1.

With the present invention, as described above, the ball has identifying means on its outer spherical surface and hence serves as an object which can be detected by the sensor unit. Therefore, the distance by which the pen-type computer input device moves can be detected without any mechanical motion transmitting means in the tip end of the shank. Accordingly, the pen-type computer input device is of a small size. The pen-type computer input device can detect small distances by which it moves, and can be handled with ease gust like a pen-shaped writing implement. The pen-type Computer input device allows the user to enter various data such as of figures, letters, numerals, and other symbols into the computer accurately as desired.

Although certain preferred embodiments have been shown and described, it should be understood that many changes and modifications may be made therein without departing from the scope of the appended claims.

What is claimed is:

1. A pen-type computer input device comprising:
   a shank having a tip end;
   a ball rotatably supported on said tip end, said ball having a plurality of identifiable regions on an outer peripheral surface thereof; and
   means including a sensor unit for detecting said identifiable regions in response to rotation of said ball, and for detecting directions in which said ball rotates and distances by which said ball moves in two perpendicular directions in a plane, and producing an output signal representative of said directions and distances.

2. A pen-type computer input device according to claim 1, wherein said identifiable regions comprise alternately arranged light-reflecting lands and light-absorbing recesses, said sensor unit comprising a plurality of photosensors each comprising a light-emitting element for applying light to said lands and recesses and a light-detecting element for detecting light reflected by said lands.

3. A pen-type computer input device according to claim 1, wherein said ball is made of a magnetic material, said identifiable regions comprising alternatively arranged lands and recesses, said sensor unit comprising a plurality of sensors each comprising a magnetic reluctance element for detecting magnetic reluctances of said lands and recesses.

4. A pen-type computer input device according to claim 1, wherein said sensor unit comprises a plurality of electrodes, said means comprising a high-frequency feedback oscillator circuit composed of said electrodes and said ball, for detecting electrostatic capacitances between said electrodes and said lands and recesses.

5. A pen-type computer input device according to claim 1, wherein said ball is made of an electrically conductive material, said identifiable regions comprise alternately arranged insulating bodies and electrically conductive regions, said insulating bodies being embedded in the outer peripheral surface of said ball, said sensor unit comprising a plurality of brushes held in sliding contact with said insulating bodies and said electrically conductive regions, for detecting electric currents flowing between said ball and said brushes.

* * * * *